United States Patent [19]

Shiomitsu et al.

[11] Patent Number: 5,700,361
[45] Date of Patent: Dec. 23, 1997

[54] METHOD FOR MANUFACTURING THIN ZIRCONIA FILM

[75] Inventors: Tohru Shiomitsu; Yasuhiko Manabe; Takashi Ogawa, all of Kawasaki; Yusaku Takita, Miyazakidai 3-4-33, Oita 870-11; Tatsumi Ishihara, Oita, all of Japan

[73] Assignees: NKK Corporation, Tokyo; Yusaku Takita, Oita, both of Japan

[21] Appl. No.: 533,946

[22] Filed: Sep. 26, 1995

[30] Foreign Application Priority Data

Nov. 24, 1994 [JP] Japan .................................. 6-312333

[51] Int. Cl.⁶ .................................................. C25D 13/02
[52] U.S. Cl. ............................ 204/491; 204/490; 204/472
[58] Field of Search ............................... 204/490, 491, 204/472

[56] References Cited

U.S. PATENT DOCUMENTS

| | | | |
|---|---|---|---|
| 3,860,506 | 1/1975 | Nickerson | 204/491 |
| 4,276,202 | 6/1981 | Schmidberger et al. | 204/290 R |
| 4,609,562 | 9/1986 | Isenberg et al. | 427/8 |
| 4,975,417 | 12/1990 | Koura | 204/491 |
| 5,002,647 | 3/1991 | Tanabe et al. | 204/490 |
| 5,021,376 | 6/1991 | Nienburg et al. | 501/153 |

FOREIGN PATENT DOCUMENTS

| | | |
|---|---|---|
| 0 008 430 | 3/1980 | European Pat. Off. . |
| 0 194 373 | 9/1986 | European Pat. Off. . |
| 0 369 289 | 5/1990 | European Pat. Off. . |
| 0 589 548 | 3/1994 | European Pat. Off. . |
| 63-58766 | 3/1988 | Japan . |

OTHER PUBLICATIONS

Patent Abstracts of Japan, vol. 012, No. 277 (E–640), 30 Jul. 1988 of JP–A–63 058766 (Toa Nenryo Kogyo KK), 14 Mar. 1988.

*Primary Examiner*—Kathryn L. Gorgos
*Assistant Examiner*—Kishor Mayekar
*Attorney, Agent, or Firm*—Frishauf, Holtz, Goodman, Langer & Chick, P.C.

[57] ABSTRACT

A method for manufacturing a thin zirconia film comprises the steps: (a) preparing a suspension in which partially-stabilized or stabilized zirconia particles having electric charges are dispersed in a solvent; (b) positioning a pair of electrodes in the suspension; (c) applying an electric field between the electrodes, said zirconia particles moving to the electrode and said zirconia particles being deposited on the electrode electrochemically; and (d) sintering the zirconia film to form a partially-stabilized or stabilized thin zirconia film.

21 Claims, 4 Drawing Sheets

METHOD FOR MANUFACTURING THIN ZIRCONIA FILM

BACKGROUND OF THE INVENTION

1. Field of the Invention

The present invention relates to a method for manufacturing a thin zirconia film, and, more particularly, to a method for manufacturing a thin zirconia film by the electrophoretic deposition method.

2. Description of the Related Art

As a method of manufacturing a solid electrolytic film, in particular, a solid electrolyte film of a solid-electrolyte type fuel cell, a chemical vapor deposition (CVD)-electrochemical vapor deposition (EVD) method has been disclosed in U.S. Pat. No. 4,609,562. The foregoing method is a method of forming a thin film having two steps that are performed at temperatures near 1273 K.

In a case where an yttria-stabilized zirconia film is formed with the foregoing method, in a first step, reactions represented by the following formulas (1) and (2) take place on a porous substrate in such a manner that the openings in the surface of the substrate are closed:

$$ZrCl_4 + 2H_2O \rightarrow ZrO_2 + 4HCl \quad (1)$$

$$2YCl_3 + 3H_2O \rightarrow Y_2O_3 + 6HCl \quad (2)$$

At this time, a surface of the substrate is subjected to an atmosphere of the reaction gases $ZrCl_4$ and $YCl_3$, while another surface of the same is subjected to an atmosphere of oxygen gas containing steam. The portions of the surface of the substrate except the portion, on which the film will be formed, are sealed up so that reactions with $ZrCl_4$, $YCl_3$, which are the reaction gases, oxygen and steam are prevented. Note that the pressure in the portion, in which the oxygen gas containing steam exists, is maintained at a level higher than that of the portion in which the reaction gases exist by about 1 Torr.

In a second step, reactions represented by the following formulas (3) and (4) proceed so that reactions among the reaction gases and oxygen ions generated due to the reactions represented by the following formulas (5) and (6) take place, whereby forming an yttria-stabilized zirconia film.

$$ZrCl_4 + 2O^{2-} \rightarrow ZrO_2 + 4e^- + 2Cl_2 \quad (3)$$

$$YCl_3 + 3O^{2-} \rightarrow Y_2O_3 + 6e^- + 3Cl_2 \quad (4)$$

$$H_2O + 2e^- \rightarrow H_2 + O^{2-} \quad (5)$$

$$O_2 + 4e^- \rightarrow 2O^{2-} \quad (6)$$

By employing the foregoing method, a fine solid electrolytic film of the order of tens of μm can easily be formed.

However, since the raw material is, in the foregoing CVD-EVD method, supplied in the form of the gas phase, there arise problems in that the yield is excessively low, a costly apparatus is required to form the film and the film forming rate is very low. What is worse, a fact has been known that use of the perovskite oxide, that has been generally used as the material for the electrode of a solid-electrolyte type fuel cell, causes the foregoing material to be subjected to corrosive gases of metal chlorides, chlorine, hydrochloric acid and the like at about 1273 K, which is the reaction temperature, thus resulting in the material being deteriorated.

SUMMARY OF THE INVENTION

It is an object of the invention to provide a method for manufacturing a thin zirconia film which is capable of manufacturing a very thin zirconia film having a uniform thickness with excellent yield attained while necessitating a simple apparatus.

It is another object of the invention to provide a method for manufacturing a thin zirconia film which is capable of manufacturing a fine and thin zirconia film with an excellent efficiency.

It is another object of the invention to provide a method for manufacturing a thin zirconia film with which the material of electrodes does not deteriorate even if a perovskite oxide is employed as the material of the electrodes.

In order to attain the object, the present invention provides a method for manufacturing a thin zirconia film comprising the steps:

(a) preparing a suspension in which partially-stabilized or stabilized zirconia particles having electric charges are dispersed in a solvent;

(b) positioning a pair of electrodes in the suspension;

(c) applying an electric field between the electrodes, said zirconia particles moving to the electrode and said zirconia particles being deposited on the electrode by an electrochemical action, thereby a zirconia film being formed; and (d) sintering the zirconia film to form a dense partially-stabilized or stabilized thin zirconia film.

DESCRIPTION OF THE PREFERRED EMBODIMENT

Figure 1:
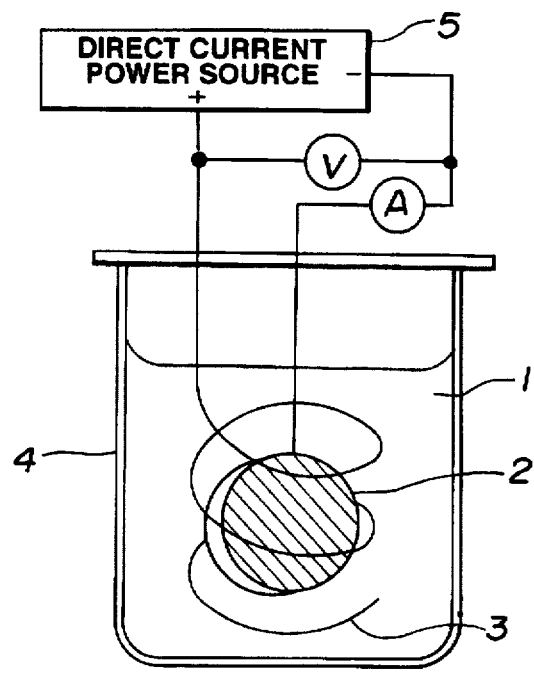
FIG. 1 is a schematic view showing an electrophoretic deposition apparatus applied to a method of manufacturing a thin zirconia film according to the present invention.

In the present invention, a suspension is prepared in which partially-stabilized or stabilized zirconia particles having electric charges are dispersed in a solvent. A pair of electrodes is positioned in the suspension and an electric field is applied between the electrodes. Said zirconia particles move to the electrode and said zirconia particles are deposited on the electrode electrochemically, thereby a zirconia film being formed. The zirconia film is sintered to form a dense partially-stabilized or stabilized thin zirconia film.

The suspension is prepared by dispersing the partially-stabilized or stabilized zirconia particles in a ketone or alcohol organic solvent. The organic solvent is preferably acetylacetone.

In the present invention, a electric conductivity of the suspension can be adjusted by adding iodine to the suspension. The electric conductivity is monitored to measure the quantity of iodine that is consumed when the particles are electrophoretically deposited on the electrode. Iodine in a quantity corresponding to the consumed quantity is further added.

The electrode, on which the partially-stabilized or stabilized zirconia particles are deposited, is made of a perovskite solid solution of oxide represented by general formula $(Ln_{1-x}A_x)_yDO_3$ where Ln is at least one lanthanoids, A is at least one selected from a group consisting of Ca, Sr and Ba, D is at least one selected from a group consisting of Mn, Cr and Co, and x and y respectively satisfy $0 \leq X \leq 1$ and $0.8 \leq Y \leq 1$.

In the present invention, a thin zirconia film is manufactured by employing the electrophoretic deposition method with which a thin film is formed by the electrophoretic deposition. Since stabilized or partially-stabilized zirconia particles, which are the raw material for forming the zirconia film, are used while being dispersed in the solvent in a case where the thin zirconia film is formed by the electrophoretic deposition method, the yield of the raw material can be raised as compared with the CVD-EVD method in which the raw material is supplied by means of vapor of metal chlorides.

By preparing the suspension for use in the electrodeposition by using the ketone or alcohol organic solvent, gas generation is prevented on the surface of the substrate of the electrode when the electrodeposition is performed, and therefore the density of deposition of zirconia particles is raised on the electrode. As a result, a dense film can be obtained. Thus, the foregoing method is suitable for forming an electrolytic film that must be formed densely. By adding iodine to the solvent in an appropriate quantity, the electric conductivity of the suspension can be raised, so that the quantity of zirconia that is deposited per unit time period is enlarged. Thus, the film can efficiently be formed.

Since the electrophoretic deposition method is capable of easily controlling the quantity of deposited zirconia in accordance with the applied voltage and time in which the electrophoretic deposition is performed, the thickness of the obtained zirconia film can precisely be controlled.

Furthermore, the electric conductivity of the suspension is always monitored at the time of performing the electrophoretic deposition to measure the quantity of consumed iodine so as to further add iodine in a quantity corresponding to the consumed quantity, whereby maintaining the electric conductivity at a predetermined level. Thus, the film can always be formed efficiently, and therefore the film thickness can accurately be controlled.

Also in a ease where the perovskite solid solution of oxide represented by general formula $(Ln_{1-x}A_x)_yDO_3$ (where Ln is at least one lanthanoids, A is at least one selected from a group consisting of Ca, Sr and Ba, D is at least one selected from a group consisting of Mn, Cr and Co, and x and y respectively satisfy $0 \leq X \leq 1$ and $0.8 \leq Y \leq 1$), which has been generally used as the material of the electrodes of a solid-electrolyte type fuel cell, is used as the electrode (the electrode substrate), on which zirconia particles are deposited at the time of performing the electrophoretic deposition, the electrode substrate is not subjected to corrosive substances during the film forming process. Thus, deterioration in the substrate can significantly be prevented.

EXAMPLE

A process of forming a zirconia film will now be described as an example of the method of manufacturing a thin zirconia film by the electrophoretic deposition method according to the present invention. In addition, results of evaluation test of a solid-electrolyte type fuel cell using the foregoing film will now be described.

Yttria stabilized zirconia particles (8 mol % $Y_2O_3/ZrO_2$) were used as the electrolyte material, and various ketones, alcohols and water shown in Table 1 were used as the solvents so that a suspension for use in the electrophoretic deposition process was prepared. To adjust the electric conductivity, iodine was added in a variety of quantities. At this time, zirconia particles were added by 10 g with respect to 1 liter of the solvent.

The thus-prepared suspension was processed with ultrasonic waves, so that the zirconia particles were dispersed sufficiently.

As shown in FIG. 1, $La_{0.8}Sr_{0.2}MnO_3$ was, as an electrode substrate 2 for electrically depositing zirconia, immersed in a suspension 1 in a container 4. A platinum wire 3 was spirally disposed at the counter electrode to surround the $La_{0.8}Sr_{0.2}MnO_3$ electrode substrate 2. Then, the $La_{0.8}Sr_{0.2}MnO_3$ electrode substrate 2 was set as the cathode and the platinum wire 3 was set as the anode, and predetermined voltage was applied from a direct current power source 5. As a result, a green zirconia film was formed on the electrode substrate 2. The green zirconia film formed on the substrate was dried at room temperature, and then the zirconia film was, in the air, sintered at temperature of 1523 K to 1573 K, so that a dense zirconia film was obtained.

Figure 2:
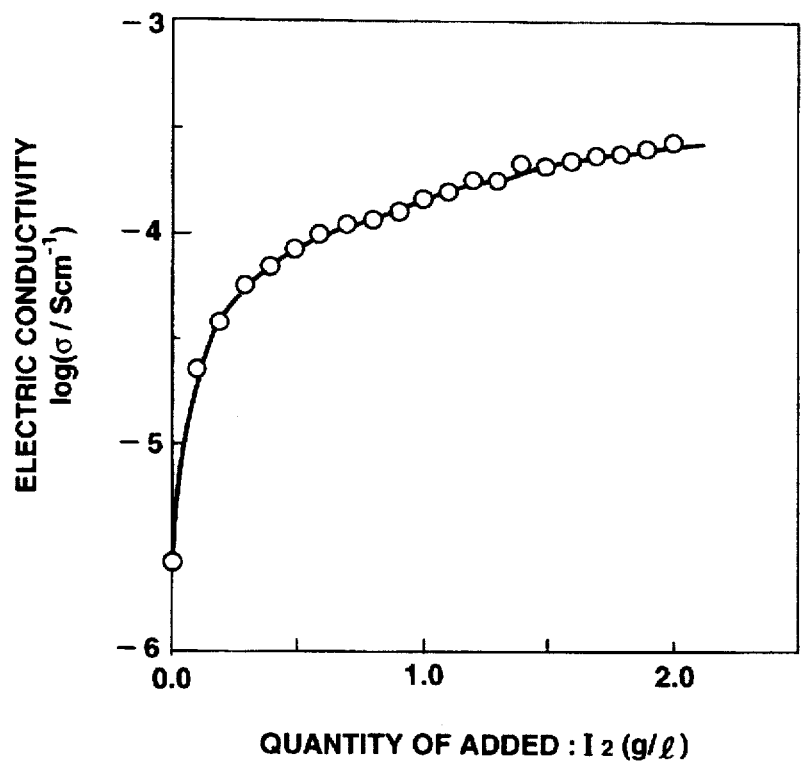
FIG. 2 is a graph showing the relationship between the electric conductivity of a suspension and the quantity of added iodine in a case where acetylacetone is used as the solvent.
Figure 3:
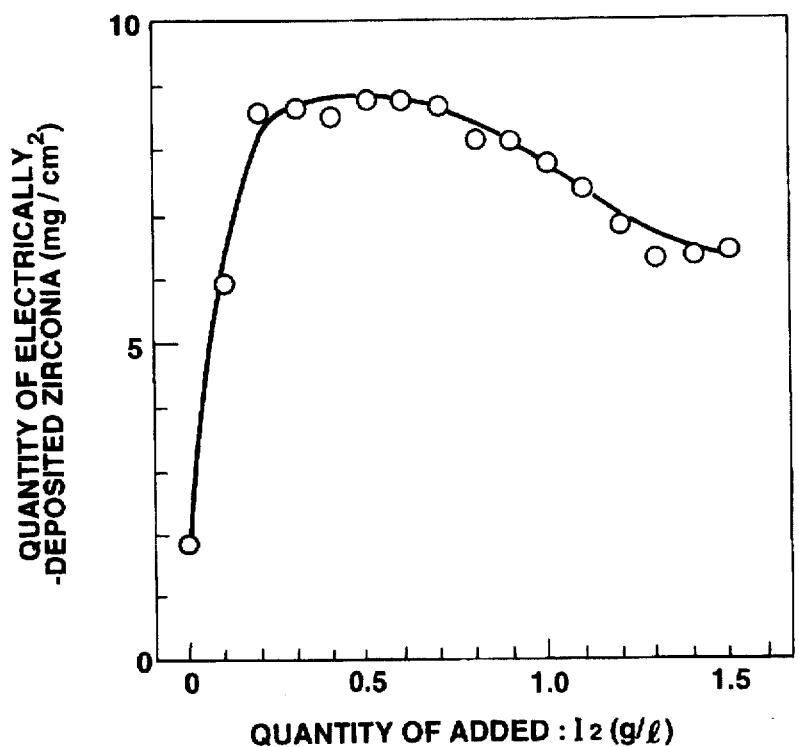
FIG. 3 is a graph showing the dependency of the quantity of zirconia to be electrically deposited upon the quantity of added iodine.

FIG. 2 is a graph showing the relationship between the quantity of added iodine and the electric conductivity of the suspension at 298 K (25° C.) in a case where acetylacetone was used as the solvent. As shown in FIG. 2, it was confirmed that the electric conductivity of the suspension is raised as the quantity of added iodine increases. FIG. 3 is a graph showing the relationship between the quantity of added iodine and the quantity of electrically deposited zirconia in a ease where acetylacetone was used as the solvent, the applied voltage was 10 V and the time in which the electrophoretic deposition was performed was 3 minutes. As shown in FIG. 3, the quantity of electrically deposited zirconia has a maximal value with respect to the quantity of added iodine. That is, facts have been confirmed that the increase in the quantity of added iodine to raise the electric conductivity initially enlarges the quantity of electrophoretic deposition and that the quantity of electrophoretic deposition decreases if the quantity or added iodine exceeds a predetermined value. Therefore, to efficiently form the film while enabling the film thickness to be controlled, the quantity of iodine to be added must be controlled in such a manner that the electric conductivity is maintained at a predetermined value. That is, if the electric conductivity of the suspension is, during the electrophoretic deposition, maintained within a range near the value, at which the quantity of electrically deposited zirconia becomes the maximal value as shown in FIG. 3, a film can be formed efficiently such that a large quantity of electrophoretic deposition per unit time can be realized. Another fact that the film thickness can be controlled accurately can be understood. Therefore, it is preferable that the quantity of iodine to be added be determined in such a manner that the electric conductivity of the suspension is included in a range near the maximal value shown in FIG. 3. Note that the maximal quantity of electrophoretic deposition is not determined simply in accordance with the quantity of iodine and the electric conductivity because it also depends upon the concentration of zirconia particles.

Table 1 shows film forming conditions, the quantities of electrically deposited zirconia and the film qualities with various solvents in a case where respective films have been formed in accordance with the foregoing procedure.

TABLE 1

| Solvent | Quantity of added iodine (g/l) | Applied voltage (V) | Time in which electro- deposition is performed (min) | Quantity of electri- cally deposited zirconia (mg/cm$^2$) | Quality of formed film |
|---|---|---|---|---|---|
| Acetylacetone | 0.6 | 10 | 5 | 14.0 | uniform |
| Acetone | 0.25 | 300 | 5 | 2.1 | uniform |
| Cyclohexane | 0.2 | 100 | 3 | 15.1 | uniform |
| Ethanol | 0.6 | 100 | 3 | 38.3 | many cracks |
| Methyliso- butylketone | 0.2 | 100 | 3 | 13.8 | many cracks |
| 3-pentanone | 0.2 | 100 | 3 | 5.6 | non- uniform |
| 4-methyl- acetophenone | 0.2 | 100 | 3 | 1.1 | non- uniform |
| Water (pH = 2.5) | 0 | 10 | 3 | very small quantity | dot-like shape |
| Methylethyl- ketone | 0.2 | 300 | 3 | very small quantity | — |
| Propiophenone | 0.2 | 300 | 3 | very small quantity | — |

As shown in Table 1, when 3-pentanone, 4-methylacetophenone, methylethylketone, propiophenone or water was used as the solvent, the quantity of electrically deposited zirconia was very small and the film forming efficiency was unsatisfactory.

When ethanol or methylisobutylketone is used, a large quantity of zirconia could be electrically deposited and thus a somewhat efficient film forming could be performed. However, a multiplicity of cracks were observed in the foregoing case and thus a confirmation was made that a dense electrolyte film could not easily be obtained.

When acetylacetone, acetone or cyclohexane was used, a significantly uniform film was obtained though the quantity of electrophoretic deposition varied depending upon the quantity of added iodine, applied voltage and the time in which the electrophoretic deposition was performed.

Figure 4:
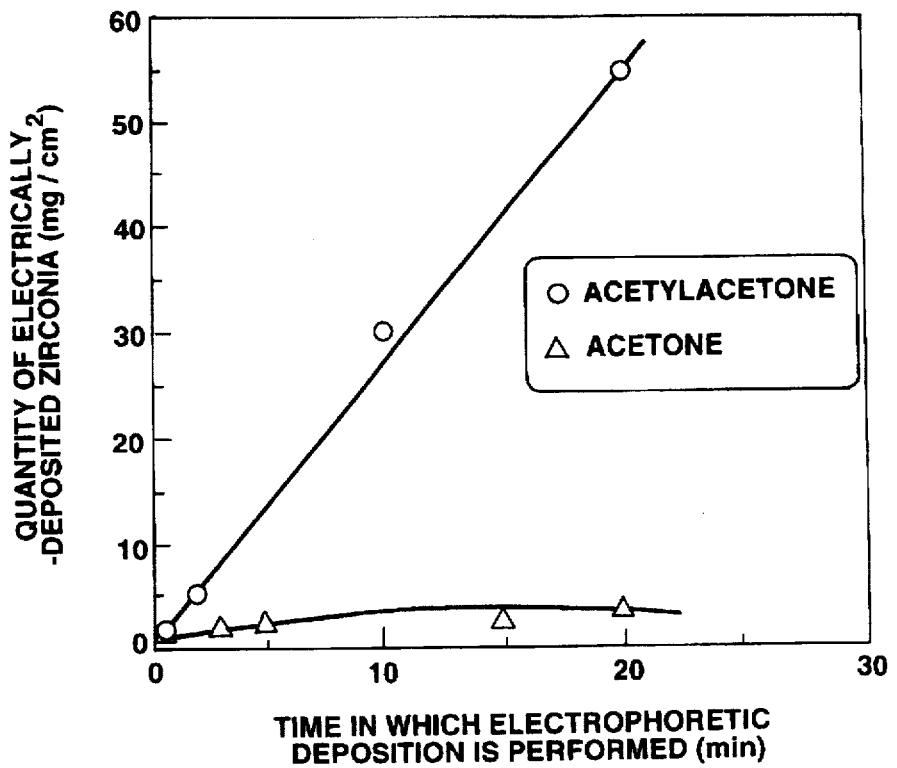
FIG. 4 is a graph showing the dependency of the quantity of zirconia to be electrically deposited upon the time in which the electrophoretic deposition is performed.

In particular, when acetylacetone was used as the solvent, a fact was confirmed that the quantity of electrically deposited zirconia and the time in which the electrophoretic deposition was performed has a proportional relationship as shown in FIG. 4 and thus the film thickness could be controlled widely by means of the time in which the electrophoretic deposition was performed. On the contrary, when acetone was used as the solvent, the quantity of electrically deposited zirconia was immediately saturated with respect to the time in which the electrophoretic deposition was performed as shown in FIG. 4. Thus, a fact was confirmed that a relatively thick film could not easily be obtained.

Figure 5:
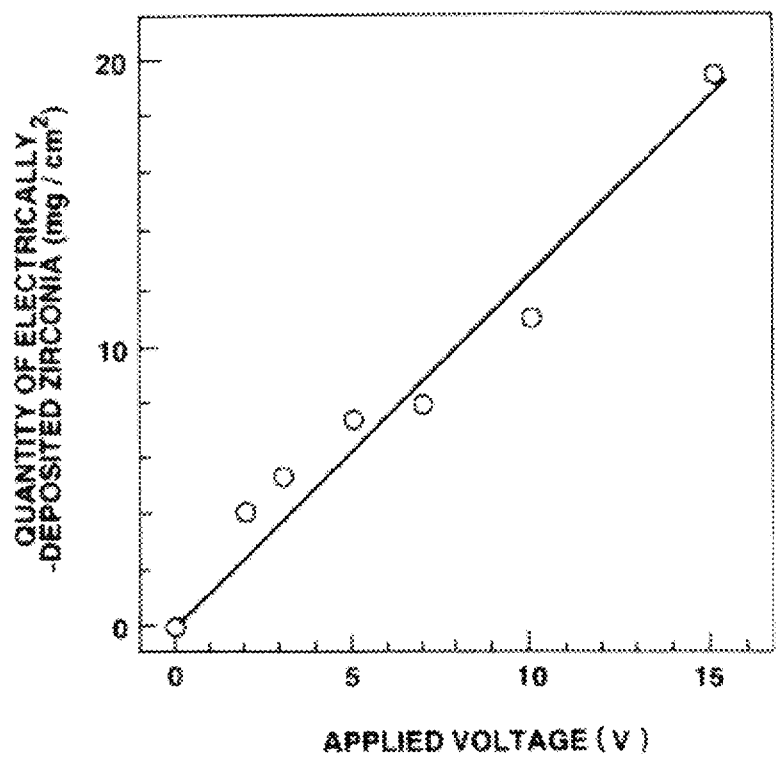
FIG. 5 is a graph showing the dependency of the quantity of zirconia to be electrically deposited upon the applied voltage.

FIG. 5 shows the relationship between the applied voltage and the quantity of electrically deposited zirconia in a case where acetylacetone was used as the solvent (the time in which the electrophoretic deposition was performed: 3 minutes; the quantity of added $I_2$:0.6 g/litter). As can be understood from FIG. 5, change in the applied voltage as well as enables the quantity of electrically deposited zirconia per unit time to be controlled.

On the basis of the foregoing result, acetylacetone was used as the solvent, stabilized zirconia particles were added at a rate of 10 g/litter and iodine was added at a rate of 0.5 g/litter so that a suspension was prepared, and the electrophoretic deposition was performed under conditions that the applied voltage was 20 V and the time in which the electrophoretic deposition was performed was one minute. When the electrophoretic deposition was performed, the electric conductivity of the suspension was always monitored to control the quantity of iodine to be added in such a manner that the electric conductance was set in a range of $1\times10^{-5}$ to $1\times10^{-3}$ Scm$^{-1}$ with which the quantity of electrophoretic deposition was made to be the maximum value or in the vicinity of the same.

The obtained film in the green state was dried at room temperature, followed by being sintered in the air at 1523 K to 1573 K.

The foregoing electrophoretic deposition and sintering processes were repeated 5 to 6 times under the same conditions, so that a dense zirconia electrolytic film was obtained. In the foregoing case, the quantity of electrophoretic deposition was controlled by means of parameters of the voltage and the time, so that a zirconia film was obtained which had a thickness of 1 to 100 μm, which was an appropriate thickness range for a solid-electrolyte type fuel cell.

Figure 6:
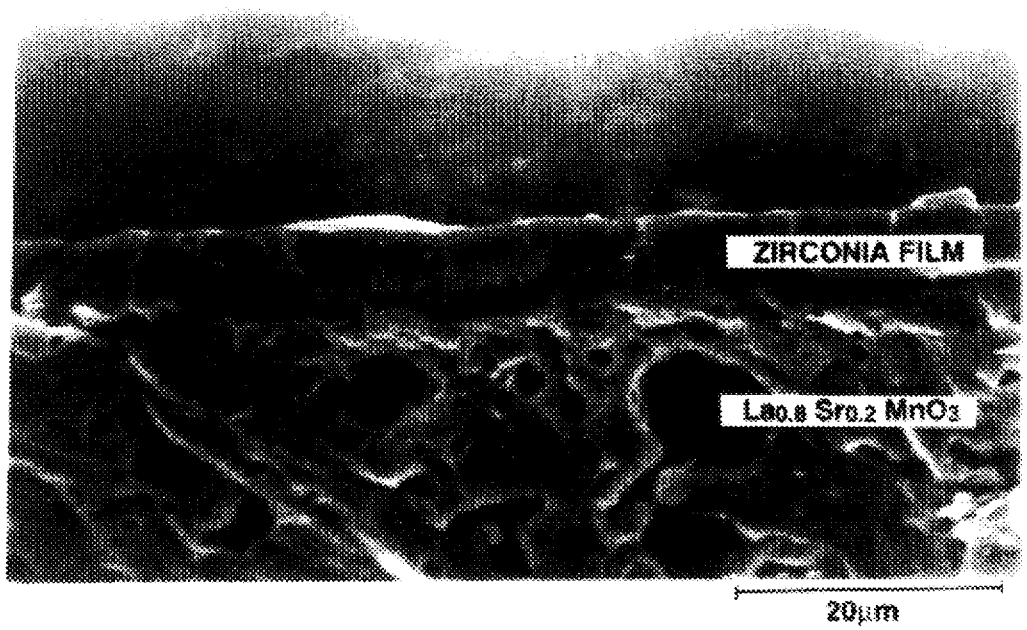
FIG. 6 shows a photograph of a zirconia electrolyte film manufactured by the method according to the present invention and taken by a scanning electron microscope.

FIG. 6 is a photograph taken by a scanning electron microscope ( SEM ) and shows a zirconia film obtained by, five times, repeating electrophoretic deposition and sintering (1573 K for 6 hours ) on the $La_{0.8}Sr_{0.2}MnO_3$ electrode substrate and having a thickness of 10 μm. As shown in FIG. 6, a fact was confirmed that a zirconia electrolytic film having the surface that exhibited excellent smoothness was obtained under the foregoing conditions.

Then, Ni was applied to the surface (which was the surface opposing the $La_{0.8}Sr_{0.2}MnO_3$ electrode substrate) of the thus-formed zirconia electrolytic film so that a fuel electrode was formed and, thus, a hydrogen-oxygen concentration cell was manufactured.

Figure 7:
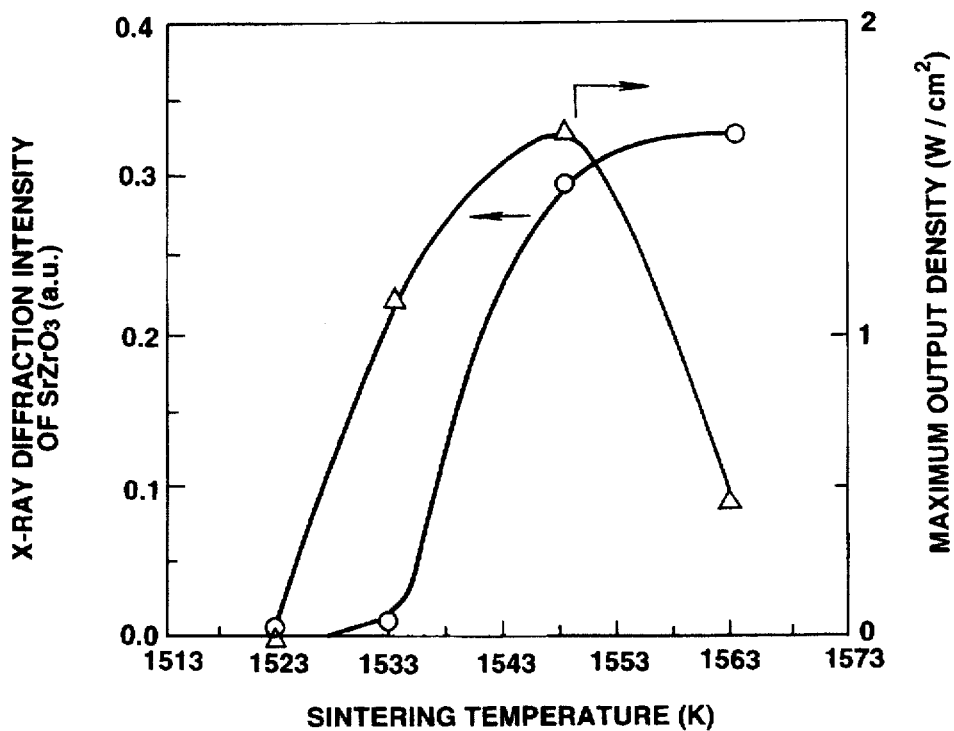
FIG. 7 is a graph showing the relationship among the sintering temperature of the zirconia film, the maximum density of the output from the hydrogen-oxygen concentration cell and the X-ray diffraction intensity of $SrZrO_3$ in the zirconia film.

FIG. 7 is a graph showing the relationship among the sintering temperature of the zirconia film, the maximum density of the output from the hydrogen-oxygen concentration cell and the X-ray diffraction intensity of $SrZrO_3$ in the zirconia film. As shown in FIG. 7, the maximum density of the output from the hydrogen-oxygen concentration cell was raised as the sintering temperature of the zirconia film was raised, and as a result of which a maximal value was indicated when the zirconia film was sintered at 1548K. The reason for this can be considered that the rise in the sintering temperature raise the density of the zirconia film and the contact between the electrolytic film and the material for the electrode to be improved and therefore the maximum output density is raised. On the other hand, the X-ray diffraction intensity of $SrZrO_3$, which is the internal resistance component, is strengthened as the sintering temperature is raised, and therefore the effect of $SrZrO_3$ becomes dominant at about 1548K. As a result, the maximum output density can be lowered.

Figure 8:
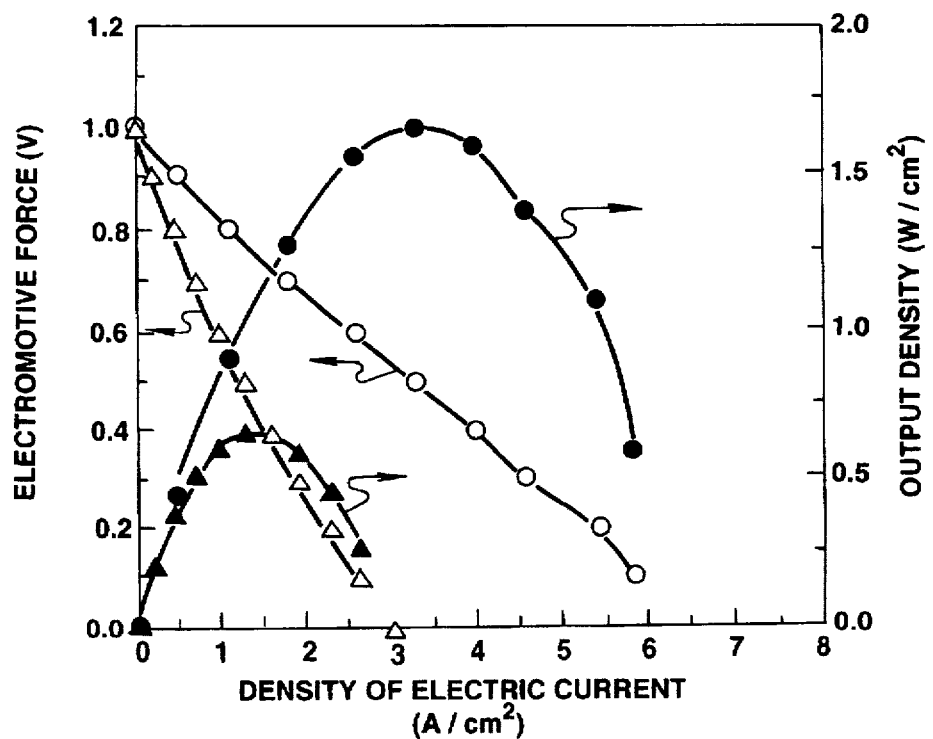
FIG. 8 is a graph showing the power generation characteristics of a solid-electrolyte type fuel cell to which the zirconia electrolytic film manufactured by the method according to the present invention is applied.

Then, the zirconia film was sintered at 1548K and the electrophoretic deposition and sintering were repeated six times so that a cell was manufactured, the cell being then used to recognize the power generation characteristics. The realized power generation characteristics were shown in FIG. 8. The cell had an open-circuit electromotive force of 1.02 V, a short-circuit electric current density of 6.5 A/cm$^2$ and a maximum output density of 1.72 W/cm$^2$. The opening-circuit electromotive force of 1.02 V considerably approximated a theoretical open-circuit electromotive force of a hydrogen/oxygen fuel cell.

Although yttria-stabilized zirconia particles were employed in the foregoing embodiment, the stabilization element is not limited to this. As a matter of course, partially-stabilized zirconia containing the stabilization element in a smaller quantity my be used.

As described above, according to the present invention, the thin zirconia film is formed by employing the electrophoretic deposition method. Therefore, a very thin zirconia film having a uniform thickness can be manufactured with excellent yield attained while necessitating a simple apparatus. By preparing the suspension by using ketone or alcohol organic solvent, gas generation on the surface of the electrode substrate can be prevented at the time of performing the electrophoretic deposition. Therefore, density at which the zirconia particles are deposited on the electrode can be raised, and thus a dense film can be obtained. Therefore, the foregoing method is suitable for forming a zirconia film that must be formed densely. By adding iodine to the solvent in an appropriate quantity, the electric conductivity of the suspension can be raised. As a result, the quantity of electrically deposited zirconia per unit time can be enlarged, and therefore the film can efficiently be formed. Also in a ease where the perovskite of oxide represented by general formula $(Ln_{1-x}A_x)_yDO_3$ (where Ln is at least one lanthanoids, A is at least one selected from a group consisting of Ca, Sr and Ba, D is at least one selected from a group consisting of Mn, Cr and Co, and x and y respectively satisfy $0 \leq X \leq 1$ and $0.8 \leq Y \leq 1$), which has been generally used as the material of the electrodes of a solid-electrolyte type fuel cell, is used as the electrode (the electrode substrate), on which zirconia particles are deposited at the time of performing the electrophoretic deposition, the electrode substrate is not subjected to corrosive substances during the film forming process. Thus, deterioration in the substrate can significantly be prevented. Furthermore, the quantity of electrophoretic deposition is controlled by means of parameters of the voltage and the time, so that the process of forming the thin zirconia film is easily controlled. The solid-electrolyte type fuel cell using the zirconia film manufactured by the method according to the present invention exhibits a value considerably approximating a theoretical open-circuit electromotive force of a hydrogen/oxygen fuel cell and has excellent power generating characteristics. Therefore, the zirconia film according to the present invention is significantly suitable for use in a solid-electrolyte type fuel cell.

What is claimed is:

1. A method for manufacturing a thin zirconia film comprising the steps:

preparing a suspension in which partially-stabilized or stabilized zirconia particles having electric charges are dispersed in an organic solvent consisting of ketone or alcohol;

adjusting an electric conductivity of the suspension by adding iodine to the suspension;

positioning a pair of electrodes in the suspension first of said electrodes being made of a perovskite oxide represented by the formula $(Ln_{1-x}A_x)_yDO_3$ where Ln is at least one lanthanide, A is at least one selected from a group consisting of Ca, Sr and Ba, D is at least one selected from a group consisting of Mn, Cr and Co, and X and Y respectively satisfy $0 \leq X \leq 1$ and $0.8 \leq Y \leq 1$;

applying an electric field between the electrodes, said zirconia particles moving to a first electrode of said pair of electrodes and said zirconia particles being electrophoretically deposited on the first electrode electrochemically, to form a zirconia film; and sintering the zirconia film to form a partially-stabilized or stabilized thin zirconia film.

2. The method of claim 1, wherein the ketone is acetylacetone.

3. The method of claim 1, further comprising the steps of:

monitoring the electric conductivity of the suspension to measure a quantity of iodine that is consumed when the particles are electrophoretically deposited on the electrode; and adding iodine in a quantity corresponding to the consumed quantity.

4. The method of claim 1, wherein in the formula $(Ln_{1-x}A_x)_yDO_3$ A is Ca, Sr, or Ba and B is Mn, Cr or Co.

5. The method of claim 4, wherein the A of $(Ln_{1-x}A_x)_yDO_3$ is Ca.

6. The method of claim 4, wherein the A of $(Ln_{1-x}A_x)_yDO_3$ is Sr.

7. The method of claim 4, wherein the A of $(Ln_{1-x}A_x)_yDO_3$ is Ba.

8. The method of claim 4, wherein the D of $(Ln_{1-x}A_x)_yDO_3$ is Mn.

9. The method of claim 4, wherein the D of $(Ln_{1-x}A_x)_yDO_3$ is Cr.

10. The method of claim 4, wherein the D of $(Ln_{1-x}A_x)_yDO_3$ is Co.

11. The method of claim 4, wherein the ketone is acetylacetone.

12. The method of claim 1, wherein the Ln, the A and the D of $(Ln_{1-x}A_x)_yDO_3$ are La, Sr and Mn, respectively.

13. The method of claim 12, wherein the ketone is acetylacetone.

14. The method of claim 1, wherein the perovskite oxide is $La_{0.8}Sr_{0.2}MnO_3$.

15. The method of claim 14 wherein the ketone is acetylacetone.

16. The method of claim 1, wherein the step of adjusting the electric conductivity comprises adjusting the electric conductivity of the suspension within a range of $1 \times 10^{-5}$ to $1 \times 10^{-3}$ Scm$^{-1}$ by adding the iodine to the suspension.

17. The method of claim 1, wherein the step of sintering the zirconia film comprises sintering the zirconia film at a temperature of 1523° K to 1573° K.

18. The method of claim 1, wherein the step of adjusting the electric conductivity comprises adjusting the electric conductivity of the suspension within a range of $1 \times 10^{-5}$ to $1 \times 10^{-3}$ Scm$^{-1}$ by adding the iodine to the suspension; thereafter monitoring the quantity of iodine consumed as the particles are electrophoretically deposited on the first electrode; and adding iodine in a quantity corresponding to the consumed quantity.

19. The method of claim 18, wherein in the formula $(Ln_{1-x}A_x)_yDO_3$ A is Ca, Sr or Ba and B is Mn, Cr, or Co.

20. The method of claim 19, wherein the Ln, the A and the D of $(Ln_{1-x}A_x)_yDO_3$ are La, Sr and Mn, respectively.

21. The method of claim 20, wherein the ketone is acetylacetone.

* * * * *